No. 640,148. Patented Dec. 26, 1899.
T. L. McKEEN.
RAILROAD CAR CONSTRUCTION.
(Application filed Oct. 4, 1899.)
(No Model.) 4 Sheets—Sheet 1.
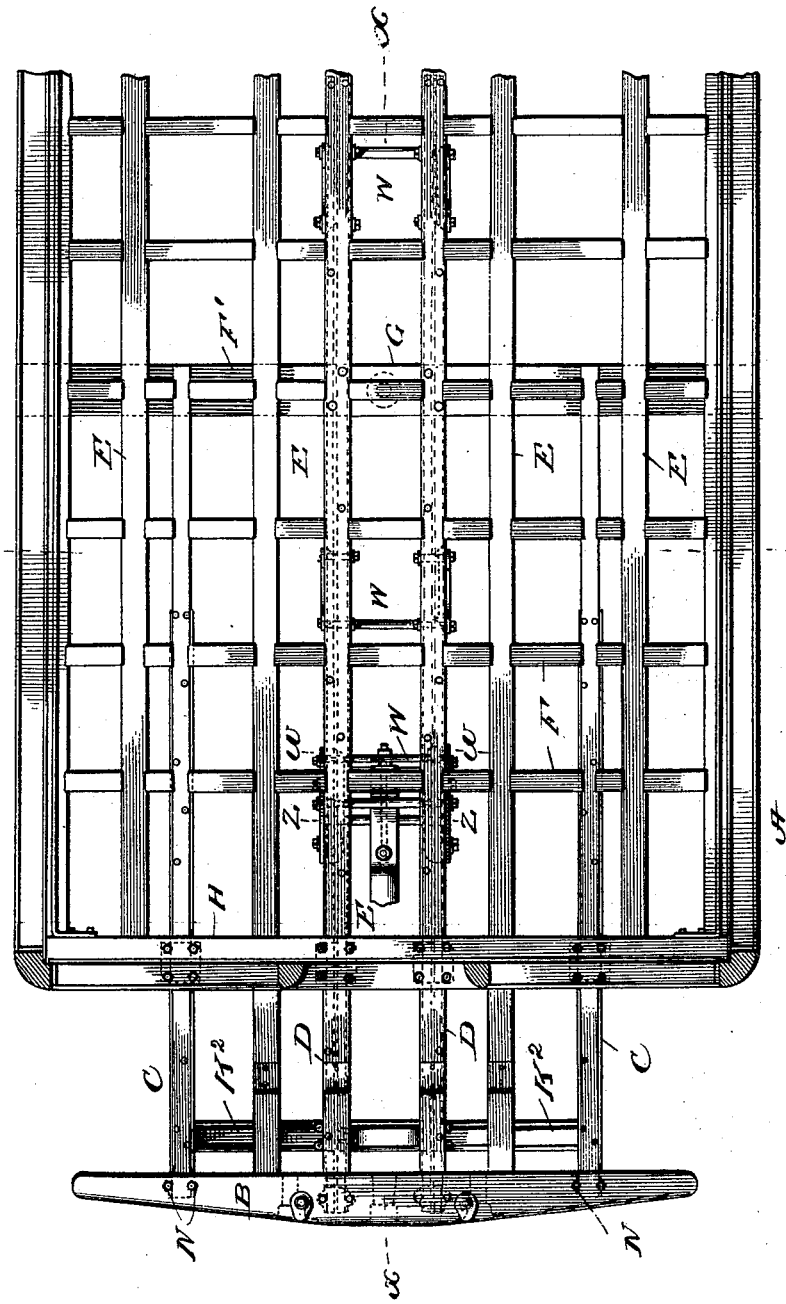

No. 640,148. Patented Dec. 26, 1899.
T. L. McKEEN.
RAILROAD CAR CONSTRUCTION.
(Application filed Oct. 4, 1899.)
(No Model.) 4 Sheets—Sheet 2.
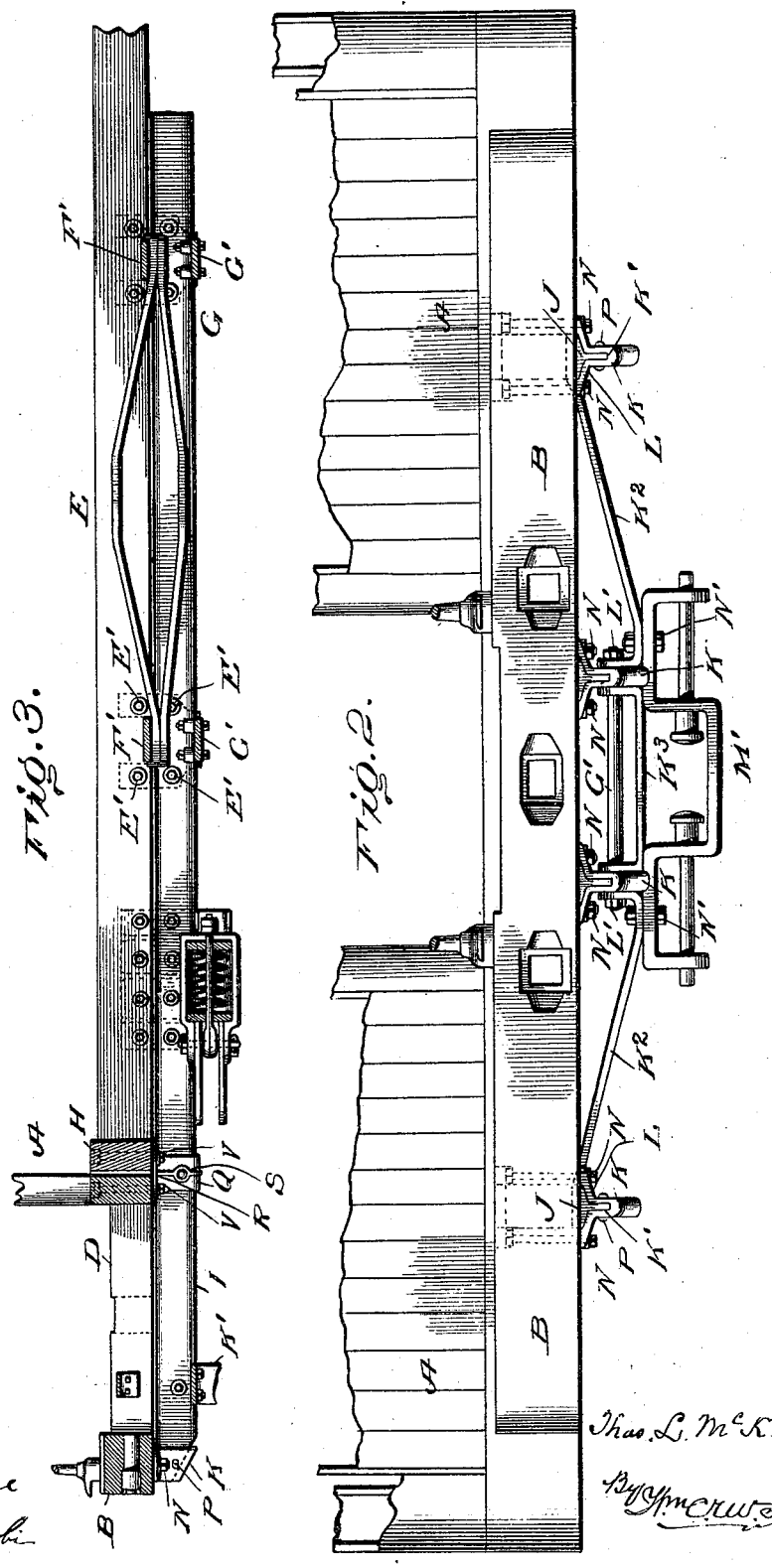

No. 640,148. Patented Dec. 26, 1899.
T. L. McKEEN.
RAILROAD CAR CONSTRUCTION.
(Application filed Oct. 4, 1899.)
(No Model.) 4 Sheets—Sheet 3.
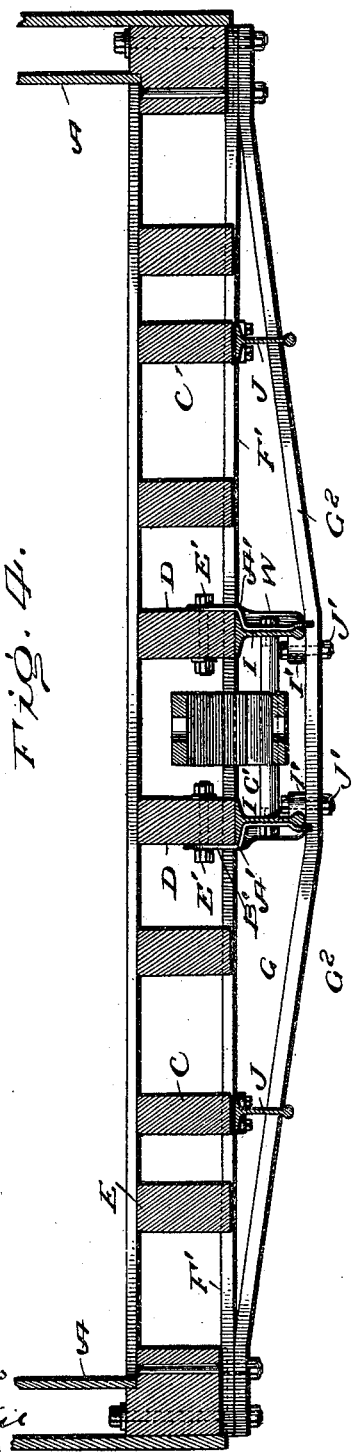
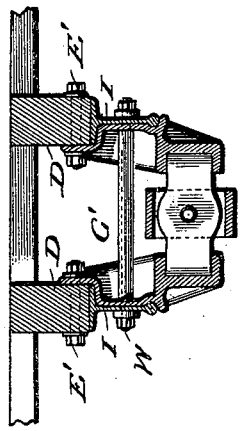
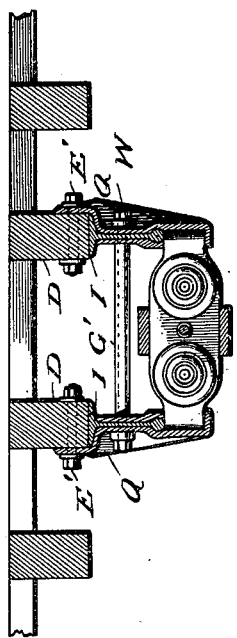
Witnesses
Inventor
Thos. L. McKeen
By Wm. C. McIntire
Attorney No. 640,148. Patented Dec. 26, 1899.
T. L. McKEEN.
RAILROAD CAR CONSTRUCTION.
(Application filed Oct. 4, 1899.)
(No Model.) 4 Sheets—Sheet 4.
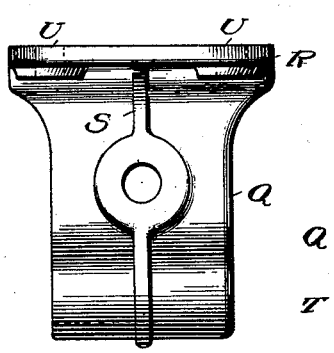
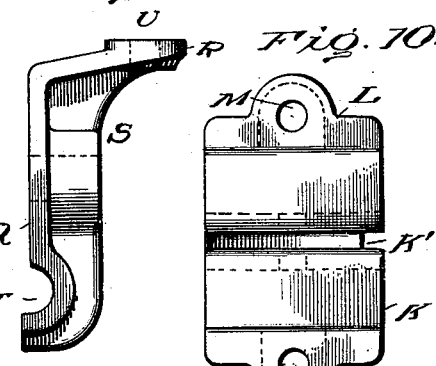
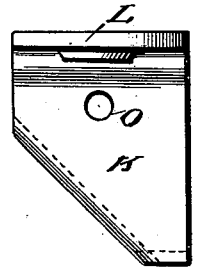
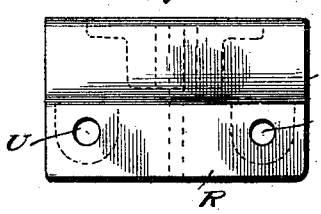
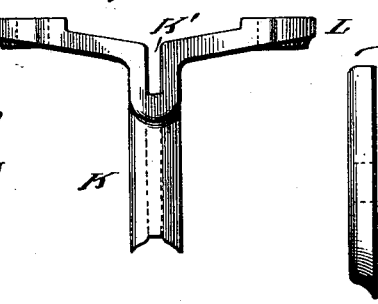
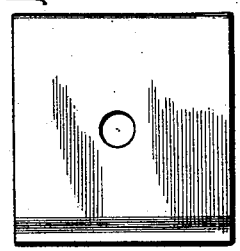
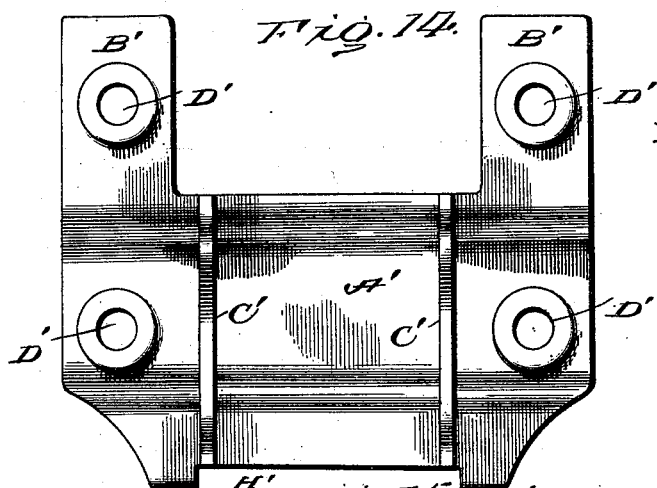
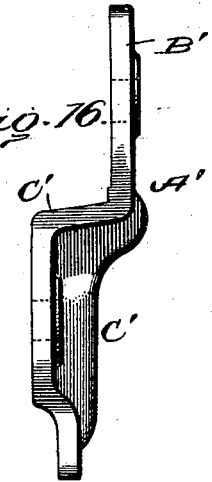
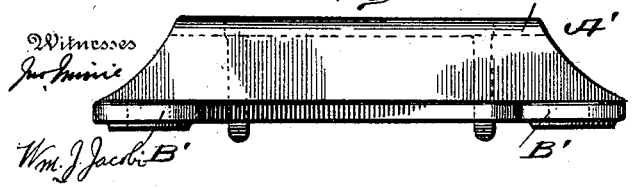
Inventor
Thos. L. McKeen
Witnesses
Wm. J. Jacobi
Attorney

UNITED STATES PATENT OFFICE.

THOMAS L. McKEEN, OF EASTON, PENNSYLVANIA, ASSIGNOR TO THE ACME RAILWAY AND EQUIPMENT COMPANY, OF NEW JERSEY.

RAILROAD-CAR CONSTRUCTION.

SPECIFICATION forming part of Letters Patent No. 640,148, dated December 26, 1899.

Application filed October 4, 1899. Serial No. 732,517. (No model.)

*To all whom it may concern:*

Be it known that I, THOMAS L. McKEEN, a citizen of the United States, residing at Easton, in the county of Northampton and State of Pennsylvania, have invented certain new and useful Improvements in Railroad-Car Construction; and I do hereby declare the following to be a full, clear, and exact description of the invention, such as will enable others skilled in the art to which it appertains to make and use the same.

My invention relates to certain new and useful improvements in car construction, and particularly to that class in which metal deck-beams are substituted for the ordinary draft-timbers and subsills.

My invention has for its principal object to secure greater rigidity and strength of the deck-timbers and to prevent the same from in any manner changing in their vertical parallelism and also to secure greater strength and firmness in the under framing of cars.

With these ends in view my invention consists in the details of construction and arrangement hereinafter more fully described.

In order that those skilled in the art to which my invention appertains may fully understand the same, I will proceed to describe the construction and advantages thereof, referring by letters to the accompanying drawings, in which—

Figure 1 is a plan view of a car construction embodying my invention. Fig. 2 is an end view. Fig. 3 is a detail longitudinal section taken on line $x$ $x$ of Fig. 1. Fig. 4 is a transverse section taken on line $y$ $y$ of Fig. 1. Fig. 5 is a similar view taken on line $z$ $z$ of Fig. 1. Fig. 6 is a detail cross-section on line $w$ $w$, Fig. 1. Fig. 7 is a side elevation of the yokes employed to secure the beams in place and through the medium of which and tie-bolts and pipe-washers the beams are held in parallelism. Fig. 8 is an end elevation thereof, and Fig. 9 is a top or plan view of the same. Fig. 10 is a top or plan view of the closed yokes used at the ends of draft-beams and subsills; Fig. 11, a side elevation thereof, and Fig. 12 a front view of the same; Fig. 13, plan and end views of washers used under the flange of the beams where the bolts pass through the longitudinal sills of the platform and car. Fig. 14 is a front elevation of a transom-yoke adapted to the shape of the beams. Fig. 15 is a top or plan view thereof, and Fig. 16 an end elevation of the same.

Similar letters of reference indicate like parts in the several figures of the drawings.

A is the car-body, partially shown at Figs. 2, 3, and 4; but as it forms no part of my invention it is not shown in full or elsewhere.

B is the platform end timber. C are the outer car and platform sills. D are the inner longitudinal draft-timbers, which, with the necessary and usual longitudinal sills E, cross-beams F, bolster G, and car end sills H, constitute the ordinary deck of a car. With this usual construction it has been necessary to strengthen and stiffen the same by the employment of subsills below the outer car-sills C and also the inner draft-timbers D, which have been secured in place by vertical bolts passing through the subsills and longitudinal car-sills and draft-timbers and also through the bottom of the car. This construction is undesirable for many reasons, and for the subsills I substitute longitudinal steel beams I I under the draft-timbers D D and metal beams J J under the longitudinal sills C. These beams are of the form in cross-section shown at Figs. 4, 5, and 6 and of a depth sufficient to secure the required strength and are secured in position in the manner which I will now describe.

The beams are secured at the ends to the sills C and draft-timbers D by metal yokes K of the form shown at Figs. 10, 11, and 12, and the ends of the sills and draft-timbers are beveled off, as clearly shown in dotted lines at Fig. 3, to conform with the pocket or space K' between the two sides of the yoke, as clearly seen at Fig. 12. The steel beams are formed with flanges to fit the under sides of the sills, and the lower extremity is formed with a round head, as shown. The yokes K are formed with wings L extending beyond the flanges of the steel beams and formed with bolt-holes M for the passage of screw-bolts N, which pass up through the platform end sill and are secured in position by suitable nuts. Transverse screw-bolt holes O are formed in the sides of the yoke, adapted to receive screw-bolts P, (see Fig. 2,) and in this manner the ends of the steel beams and the yokes are rigidly fixed in relation to each other and also to the sills and draft-timbers.

At the point where the steel beams intersect the transverse plane of the car end sills I employ bracket-yokes Q. (Shown clearly at Figs. 7, 8, and 9.) The yokes are beveled at the top on wings, as shown clearly at Fig. 8, to fit the under inclined surface of the flanges of the steel beams and are formed with a wing R and central vertical strengthening-rib S, while the lower extremity is formed with a longitudinal groove T, adapted to surround and fit the lower rounded extremities of the steel beams, and vertical bolt-holes U through the wings V, (see Fig. 3,) which pass through the end beams H, and are secured in place by screw-nuts in an obvious manner.

I have shown at Figs. 5 and 6 a draw-bar attachment suited to my improved deck construction; but as it forms no part of my present invention it need not be further explained except to state that the tie-bolts W are the same as are employed at other localities, as will be presently explained.

Where the body-bolsters G intersect the sills and draft-timbers I employ yoke-brackets A', such as shown at Figs. 14, 15, and 16, which, as clearly shown at Fig. 14, are wide enough to embrace the bolster on each side thereof, with two upward-extended wings B' outside of the beveled seat C' (see Figs. 14 and 16) for the flange of the metal beam, it is formed with vertical strengthening-ribs C' and with bolt-holes D' to receive bolts E' and W, (see Fig. 4,) the former extending through the wings B' and the draft-timbers D and the latter through the body of the yoke and the webs of both of the steel beams I. The bolts W pass through pipe-washers G' of a length just equal to the distance between the inside faces of the webs of the steel beams, which constitute braces, and when the screw-nuts are in place upon the ends of the bolts E' and W the steel beams I are held in fixed parallelism in an obvious manner. The lower extremities of the yokes A' are flared outwardly to accommodate the round head of the steel beams I.

The vertical recess between the wings B' of the yoke-brackets A' is of sufficient depth to receive both the bolster G and the flitch-plate F', and the brace-plate G² passes under and against the round head of the steel beams I, which may be slightly mortised to receive the brace-plate, which under such conditions serves to prevent any longitudinal movement of the beams I. The lower edge of the yoke A' is formed with a recess H' (shown clearly at Fig. 14) for the passage of the brace-plate and serves the same purpose (and is preferred) as the recess in the head of the steel beams.

I' are washers with one edge recessed to fit the head of the steel beams, and they are secured in position by vertical screw-bolts and nuts J', as shown at Fig. 4, and thus tie the brace-plate to the steel beams I. The front brace-plates are made in three parts, as most clearly shown at Fig. 2. The outer ends of the two outer portions K² are secured by the vertical bolts N to the outer car and platform sills C, and the inner ends are turned upwardly, as shown, to lie against a suitable filling-piece against the outer faces of the webs of the steel beams I. The third or middle portion K³ has both ends bent up at right angles, and filling-pieces are interposed between said ends and the inner faces of the webs of the metal beams I, and the parts K² and K³ are secured to the metal beams I by screw-bolts and nuts L'. In this construction of the brace-plate the middle section subserves the same purpose as the pipe-washers G', and hence the latter need not be used in connection with the brace-plate.

The round heads of the steel beams I are notched or mortised to receive the carry-iron M', which is secured in place by bolts and nuts N', as clearly shown at Fig. 2.

In addition to the yokes and brackets described for securing the metal beams in position vertical bolts passing through the flanges of the steel beams and the draft-timbers and sills may be employed at such localities as may be thought desirable.

From the construction shown and described it will be seen that the ordinary timber deck-beams and all of the ordinary subsills are dispensed with, and consequently the usual long bolts employed for securing them in position are also dispensed with, this latter consideration being of great importance owing to the great difficulty in boring the bolt-holes accurately and the large number required.

What I claim as new, and desire to secure by Letters Patent, is—

1. In car construction the car end platform-sills and draft-timbers supported on the flanged steel beams I, J, secured to the platform end timbers by the pocket-yokes K, to the car end timbers by the bracket-yokes Q, and at the intersection of the sills and draft-timbers with the bolsters, by yoke-brackets A', the yokes K and yoke-brackets Q being secured to the end timbers by vertical bolts, and the brackets A' secured by horizontal bolts, substantially as described.

2. In combination with the sills and draft-timbers and the steel deck-beams I, J, supporting said sills and timbers and secured in position by yokes and brackets as described, bolts W, and pipe-washers G', substantially as and for the purpose set forth.

3. In combination with the draft-timbers D, steel beams I, bracket-yokes A' and brace-plate G², the washers I', and screw-bolts and nuts J', substantially as and for the purpose set forth.

4. In combination with the sills and draft-timbers supported on the steel deck-beams J, I, the platform brace-plate composed of the parts $K^2, K^2, K^3$, secured in position, substantially as shown and described.

5. In combination with draft-timbers, steel deck-beams I, and brace-plate $K^2, K^2, K^3$, the carry-iron M' located in mortises in the deck-beams I, and secured to the brace-plate by bolts and nuts N', substantially as hereinbefore set forth.

In testimony whereof I affix my signature in presence of two witnesses.

THOMAS L. McKEEN.

Witnesses:
WM. H. SIEGFRIED,
E. L. BIXLER.